United States Patent
Meier et al.

(10) Patent No.: US 7,684,355 B2
(45) Date of Patent: Mar. 23, 2010

(54) TRANSPARENT WIRELESS BRIDGE ROUTE AGGREGATION

(75) Inventors: Robert Meier, Cuyahoga Falls, OH (US); Shahriar Rahman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 421 days.

(21) Appl. No.: 11/688,021

(22) Filed: Mar. 19, 2007

(65) Prior Publication Data

US 2008/0232383 A1 Sep. 25, 2008

(51) Int. Cl.
*H04L 12/46* (2006.01)

(52) U.S. Cl. .................. 370/256; 370/401

(58) Field of Classification Search .......... 370/252, 370/254–256, 389, 390, 392, 400, 401; 709/238, 709/240, 242, 249
See application file for complete search history.

(56) References Cited

U.S. PATENT DOCUMENTS

| | | | |
|---|---|---|---|
| 6,766,381 B1 * | 7/2004 | Barker et al. ................ 709/246 |
| 6,876,652 B1 * | 4/2005 | Bell et al. ................... 370/386 |
| 7,020,696 B1 * | 3/2006 | Perry et al. ................. 709/223 |
| 7,123,608 B1 * | 10/2006 | Scott et al. ................. 370/353 |
| 7,130,870 B1 * | 10/2006 | Pecina et al. ................ 707/203 |
| 7,222,147 B1 * | 5/2007 | Black et al. ................. 709/200 |
| 7,240,364 B1 * | 7/2007 | Branscomb et al. ............ 726/9 |
| 7,280,529 B1 * | 10/2007 | Black et al. ................. 370/352 |
| 7,561,549 B2 * | 7/2009 | Meier et al. ................. 370/331 |
| 7,606,178 B2 * | 10/2009 | Rahman et al. .............. 370/256 |
| 2002/0001307 A1 * | 1/2002 | Nguyen et al. .............. 370/386 |
| 2002/0165961 A1 * | 11/2002 | Everdell et al. ............. 709/225 |
| 2003/0120822 A1 * | 6/2003 | Langrind et al. ............ 709/251 |
| 2003/0126195 A1 * | 7/2003 | Reynolds et al. ............ 709/203 |
| 2003/0167348 A1 * | 9/2003 | Greenblat ................... 709/251 |
| 2003/0172218 A1 * | 9/2003 | Scott et al. ................. 710/303 |
| 2004/0031030 A1 * | 2/2004 | Kidder et al. ............... 717/172 |
| 2005/0198247 A1 * | 9/2005 | Perry et al. ................. 709/223 |
| 2005/0213547 A1 | 9/2005 | Meier |
| 2006/0092826 A1 * | 5/2006 | Karam et al. ................ 370/216 |
| 2007/0121656 A1 * | 5/2007 | Heidari-Bateni et al. ..... 370/402 |
| 2007/0274316 A1 * | 11/2007 | Fartmann et al. ............ 370/392 |

OTHER PUBLICATIONS

IEEE Standard for Local and Metropolitan Area Networks: Media Access Control (MAC) Bridges Std 802.1D-2004.*

* cited by examiner

*Primary Examiner*—Pankaj Kumar
*Assistant Examiner*—Duc T Duong
(74) *Attorney, Agent, or Firm*—Tucker Ellis & West LLP (57) ABSTRACT

In an example embodiment, there is described herein a "Wireless Route Aggregation Protocol" (WRAP) that is used to aggregate multiple wireless links into a WRAP "route bundle" that functions as a single logical LAN bridge link. WRAP link aggregation can be used for example to increase the bandwidth and robustness of the wireless path between two wired Ethernet LANs.

22 Claims, 6 Drawing Sheets

TRANSPARENT WIRELESS BRIDGE ROUTE AGGREGATION

BACKGROUND

Wireless bridges can be employed to bridge two Ethernet Local Area Networks (LANs) over a single radio link, such as an IEEE (Institute of Electrical and Electronics Engineers) 802.11 link. This can obviate the need for wiring and can be useful in situations where wiring is prohibitively expensive. However, wireless bridges tend to be slower so it is often desirable to employ multiple wireless links between two Ethernet LANs.

However, the deployment of multiple wireless bridges introduces other problems. For example, if two (or more) wireless links are coupled to switches to couple a secondary Ethernet LAN to a primary Ethernet LAN, a bridging loop exists unless the spanning tree protocol (STP) used by the switches (e.g. an 802.1D STP) blocks an Ethernet link between the wireless bridges or all but one of the wireless links. However, blocking the Ethernet link between two Ethernet switches can introduce another problem known as "secondary LAN fragmentation": If the STP root bridge is located in the primary Ethernet LAN and the STP cost of two or more relatively slow wireless links is similar, then the STP protocol will likely break the bridging loop by blocking a high-speed Ethernet link on an Ethernet switch in the secondary Ethernet LAN. Because of fragmentation, packets between two devices on a high-speed secondary LAN may be routed through the primary LAN. For example, because the Ethernet port of a first wireless bridge is blocked, a packet sent by a first device coupled on the secondary Ethernet network to the first wireless bridge to a second device coupled to the secondary network at the second wireless bridge will be routed by the first wireless bridge to the primary Ethernet LAN, and then to the second wireless bridge via the primary Ethernet LAN. Thus, the forwarding path is detoured across two relatively slow radio links. User configurations can be used to resolve the fragmentation problem; however, user configurations in larger more complex networks are not practical.

A Spanning Tree Protocol (STP) organizes a bridged LAN into a loop-free topology; however a STP only permits one link between any two LANS. Currently, link aggregation protocols, such as the IEEE 802.1ad port aggregation protocol, can be used to aggregate multiple links, between two Ethernet switches, into a single, logical spanning tree link, so that the overall bandwidth of the spanning tree link between two Ethernet switches is greatly increased. Current port aggregation protocols have several limitations. The user must explicitly configure the aggregation links; therefore the protocols cannot automatically adapt to lost links and new links. Wireless bridging links are far less stable than wired bridging links. The set of wireless bridging links between any two Ethernet LANs can change. New links can be added to an aggregation bundle and links may be lost from an aggregation bundle.

With existing wired port aggregation protocols, all of the links in an aggregation bundle must be terminated in a pair of Ethernet switches. A first switch, for example, cannot aggregate two links that are terminated in two peer switches. Therefore, an entire aggregated link is susceptible to the failure of a single device. In a wireless network, two wireless bridging links can operate on the same radio channel if the links are separated spatially.

Standard Ethernet switches use source learning, as defined in the IEEE 802.1D MAC Bridges specification, to determine the output port for a target address. The STP establishes a single path for all frames sent between any two stations. If frames from a single Ethernet station are directed over more than one path, then a "path flapping problem" is introduced, where the source-learned path to the station, in a transparent Ethernet LAN, is constantly changing. Current link aggregation protocols avoid the path flapping problem by restricting all links in an aggregation bundle to a single pair of Ethernet switches. However, the path flapping problem cannot be resolved by simply restricting all traffic for a single station to a single aggregation link

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, there is described herein a "Wireless Route Aggregation Protocol" (WRAP) that is used to aggregate multiple wireless links into a WRAP "route bundle" that functions as a single logical LAN bridge link. WRAP link aggregation can be used for example to increase the bandwidth and robustness of the wireless path between two wired Ethernet LANs.

In an example embodiment, there is disclosed herein an apparatus comprising a primary port, a secondary port and control logic coupled to the primary port and the secondary port. The control logic is responsive to determining the secondary port is coupled to a secondary network to operate as a secondary bridge. The control logic is responsive to operating as a secondary bridge to communicate with at least one other wireless bridge to select a master secondary bridge that is the designated bridge for the secondary network.

In an example embodiment, there is disclosed herein a method that designates a single wireless route selected from a route bundle comprising a plurality of wireless routes coupling two Ethernet local area networks (LANs) as a spanning tree path between the two Ethernet LANs. The method further comprises establishing cross routes between the two Ethernet LANs using unselected plurality of wireless routes coupling the two Ethernet LANs employing a route aggregation protocol and grouping the cross routes into an aggregate route bundle. A first of the two Ethernet LANs is established as a primary local area network (LAN) and a second of the two Ethernet LANs is established as a secondary LAN.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate examples of the present invention, and together with the description serve to explain the principles of the invention.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

In an example embodiment, there is described herein a "Wireless Route Aggregation Protocol" (WRAP) that is used to aggregate multiple wireless links into a WRAP "route bundle" that functions as single logical LAN bridge link. WRAP link aggregation can be used, for example, to increase the bandwidth and robustness of the wireless path between two wired Ethernet LANs.

A "link" is used herein to refer to a wireless link between two radios—one in each of two wireless bridges. A link is terminated by two Link Endpoints—one in each wireless bridge. In an example embodiment, a Link Endpoint is identified by a 48-bit 802 address. A single wireless bridge has 1 or more radios and each radio can support multiple link endpoints. For example, a single radio in a primary bridge may have a link to two or more secondary bridges.

A WRAP network is organized into a tree topology via a Hierarchical Spanning Tree Protocol (HSTP). A "primary LAN" is at the root of the tree topology and other "secondary LANs" are attached via wireless links. A WRAP "route" is a path from a secondary LAN to a primary LAN. A secondary LAN is attached to the primary LAN via a WRAP route bundle that is comprised of one spanning tree route and 0 or more other non-spanning-tree "cross routes".

As will be disclosed herein, a WRAP route can be comprised of a single wireless hop or multiple hops. A multi-hop WRAP route can include any combination of wireless and Ethernet links. WRAP route endpoints can be distributed across multiple devices and across multiple LAN segments. What will first be described herein is a simple WRAP that is used to aggregate wireless links that exist between two wired Ethernet LANs. An example embodiment described herein illustrates how WRAP can be extended to aggregate more complex multi-hop routes.

The WRAP disclosed herein is transparent to Ethernet bridges and switches; therefore, it does not require changes to existing Ethernet switches/bridges. Thus, wireless bridge's that are configured to operate using WRAP are compatible with legacy systems.

Figure 1:
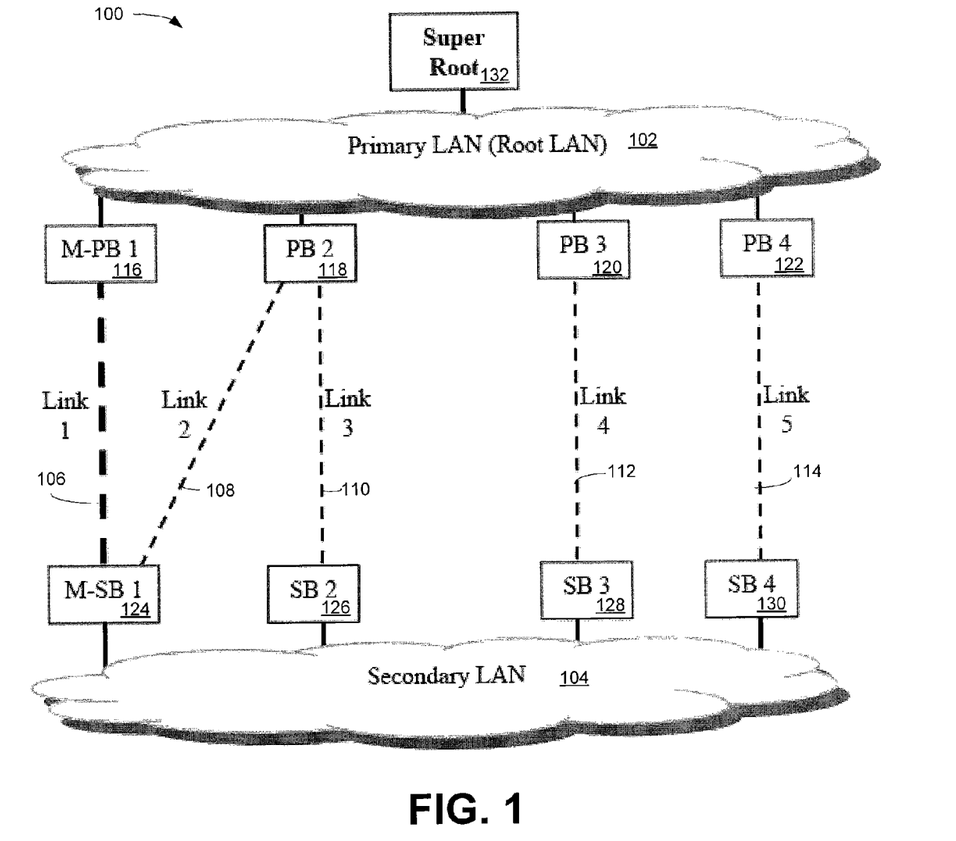
FIG. 1 is an example embodiment of a simple WRAP network.

A simple example WRAP network 100 is illustrated in FIG. 1. The example network 100 has a primary Ethernet LAN 102 and a single secondary Ethernet LAN 104, which are connected by a Route Bundle comprised of 5 member links 106, 108, 110, 112, 114. Wireless links 106, 108, 110, 112, 114 are depicted as dashed lines and Ethernet links to Ethernet LANs 102, 104 are depicted as solid lines. The "Root LAN," is referred to herein as a "Primary LAN". In an example embodiment, it is assumed that the "primary LAN" (e.g. LAN 102) is the HSTP (Hierarchical Spanning Tree Protocol) "root LAN". However, the definition of a primary LAN can be extended as will be described herein in the description for FIG. 4. A secondary LAN, such as LAN 104, is any, possibly bridged, wired Ethernet LAN other than the primary LAN. A secondary LAN is attached to the HSTP topology tree over 1 or more wireless links.

Wireless link 106 is on the single spanning tree branch between the primary and secondary LAN. The other member links 108, 110, 112, 114 are on "cross routes" between the primary and secondary LANs. As used herein, a Cross Route is a routed path between the primary LAN and a station in the spanning sub tree rooted at a secondary LAN. A cross route includes a member route, in a route bundle. A cross route may also include wired hops from a Master SB to a Slave SB.

A Wireless Bridge (WB) is any device that bridges frames over a wireless link. A WB is attached to the topology tree on its wireless or Ethernet primary port and a WB may have 1 or more other wireless or Ethernet secondary ports. A WB may also function as an Access Point (see below). A Primary Bridge (PB) is a wireless bridge that is directly connected to the Primary LAN on its Ethernet "primary port". A secondary bridge (SB) has a wireless primary port that is, directly or indirectly, attached to a parent PB over a wireless link; a SB has a secondary Ethernet port that is attached to a secondary LAN.

Each Primary Bridges (PB) 116, 118, 120, 122 is attached to the primary LAN 102 on its Ethernet primary port. PB 118 has two wireless Link Endpoints for wireless links 108 and 110, respectively. Each other PB 116, 120, 122 has a single wireless Link Endpoint for wireless links 106, 112, and 114, respectively. Each SB 124, 126, 128, 130 is attached to secondary LAN 104 on an Ethernet secondary port and each wireless Link Endpoint in an SB is attached to a corresponding wireless Link Endpoint in a PB on the primary LAN.

The Master SB (e.g. SB 124) for a secondary Link Endpoint Set (secondary LES) attached to secondary LAN 104 is the designated bridge for secondary LAN 104. A Link Endpoint Set is the set of link endpoints (e.g. PBs 116, 118, 120, 122 or SBs 124, 126, 128, 130), in a route bundle, that are attached to the same Ethernet LAN. A single "Master WB" (e.g. PB 116 or SB 124) is established for each LES; any other WB (e.g. any of PBs 118, 120, 122 or SBs 124, 126, 128) that is attached to the LES is considered a "Slave WB". A "Primary LES" is a set of link endpoints that terminates a Route Bundle on the primary LAN. A "Secondary LES" is a set of link endpoints that terminates a Route Bundle on a secondary LAN. An LES Pair is the primary LES and the secondary LES for a single Route Bundle. In FIG. 1, the 5 wireless link endpoints in SBs 124, 126, 128, 130 comprise the secondary LES for secondary LAN 104. M-SB-1 124 is the Master SB for the secondary LES and it is also the designated bridge for the attached secondary LAN.

The Master PB for a primary LES, contained in PBs on primary LAN 102, is the PB that has a spanning tree link to the Master SB for the corresponding secondary LAN. In FIG. 1, the 5 link endpoints in PBs 116, 118, 120, 122 comprise the LES attached to primary LAN 102. M-PB-1 116 is the Master PB for the primary LES.

In an example embodiment, WRAP link aggregation relies on an underlying Hierarchical Spanning Tree Protocol (HSTP). The HSTP, described in this example is a general-purpose hierarchical STP that resolves a general "high-speed LAN fragmentation problem" in networks where relatively high-speed LANs are inter-connected by relatively low-speed, redundant bridge links.

The HSTP effectively creates a spanning tree of spanning trees. An STP, such as an IEEE 802.1D STP, is used to organize each wired Ethernet LAN into a spanning tree topology comprised of Ethernet segments inter-connected by bridges. HSTP is then used to organize a set of transparently bridged wired LANs into an overall spanning tree topology. A transparently bridged "Root LAN" (e.g. LAN 102) is at the root of the HSTP spanning tree; other, transparently bridged secondary LANs (e.g. LAN 104) are attached to the Root LAN over 1 or more wireless links.

By definition, the HSTP "Super Root" (e.g. Super Root 132) is attached to Root LAN 102 on a wired Ethernet link. Root LAN 102 is a "Primary LAN". By definition, a Primary Bridge (PB) is attached to a Primary LAN on its Ethernet "primary port". By definition, a Secondary Bridge (SB) is attached to the network on a wireless primary port and a SB is attached to a "Secondary LAN" on an Ethernet "secondary port".

In an example embodiment, an election protocol is initially used to elect the Super Root for the Root LAN. Each HSTP "Super Root" candidate, on the Root LAN, sends periodic layer 2 multicast Hello messages that contain a FALSE active flag, a Bridge ID, a root priority, a zero hop count, and a zero path cost. The elected Super Root (e.g. Super Root 132 in FIG. 1) is the candidate with the highest root priority. The Bridge ID of the Super Root is the "WLAN ID" for the entire HSRP spanning tree.

The elected Super Root (e.g. Super Root 132) sends periodic Hello messages on the Root LAN (e.g. LAN 102) with the active flag set to TRUE. The multicast Hello messages are transparently bridged throughout the Ethernet Root LAN, by Ethernet bridges and switches, but the Hello messages are not transparently bridged onto wireless links. A Wireless Bridge (WB) determines that it is a Primary Bridge (PB), on the Root LAN, if it receives a Hello message from the Super Root, on its wired Ethernet port, with a "hop count" value of 0.

In general, each "attached" WB generates periodic multicast Hello messages on each of its secondary ports. The "secondary" Hello messages contain a "path cost" value that advertises the path cost to the Root LAN. The HSTP topology tree is extended as SBs select a parent WB, which provides the least-cost path to the Root LAN, and attach to the network.

An election protocol is also used to elect a single Master SB (e.g. SB 124) for each secondary LAN (e.g. LAN 104). A "candidate SB" can only participate in the Master SB election protocol if it is attached to the primary LAN over a wireless spanning tree link and it has an active Ethernet link to the respective secondary LAN. A "candidate SB" sends periodic layer 2 multicast Hello messages, on its secondary Ethernet LAN. The Hello messages contain a FALSE "active flag", the WLAN ID (e.g. the Super Root ID), a Bridge ID, a SB priority value, a non-zero hop count value, and a non-zero path cost value. The Hello messages are transparently bridged throughout the secondary LAN by Ethernet switches/bridges. In general, the elected Master SB is the candidate SB with the lowest advertised path cost. The "SB priority value" is used to break ties, if two candidate SBs advertise the same path cost. Any SB on a secondary LAN, other than the Master SB, is a "Slave SB".

The elected Master SB sends periodic Hello messages on its secondary LAN with the active flag set to TRUE. A WB determines that it is a Slave SB if a) it receives Hello messages from the active Master SB, on its secondary Ethernet port, and b) it is attached to a parent WB on a wireless link. A Slave SB transitions its Ethernet port, to the secondary LAN, to a "blocked state" if it is attached to the HSTP spanning tree on a wireless spanning tree link; otherwise, if the Slave SB is attached to the HSTP spanning tree on its Ethernet port, then the Slave SB transitions any wireless link to a parent WB to a blocked state.

In an example embodiment, the Master SB for each secondary LAN participates in a STP, such as the 802.1D STP. The Master SB is the "designated bridge" for its entire secondary LAN (which may be comprised of multiple Ethernet segments); therefore, it provides the only spanning tree path from the secondary LAN to the primary LAN.

Figure 2:
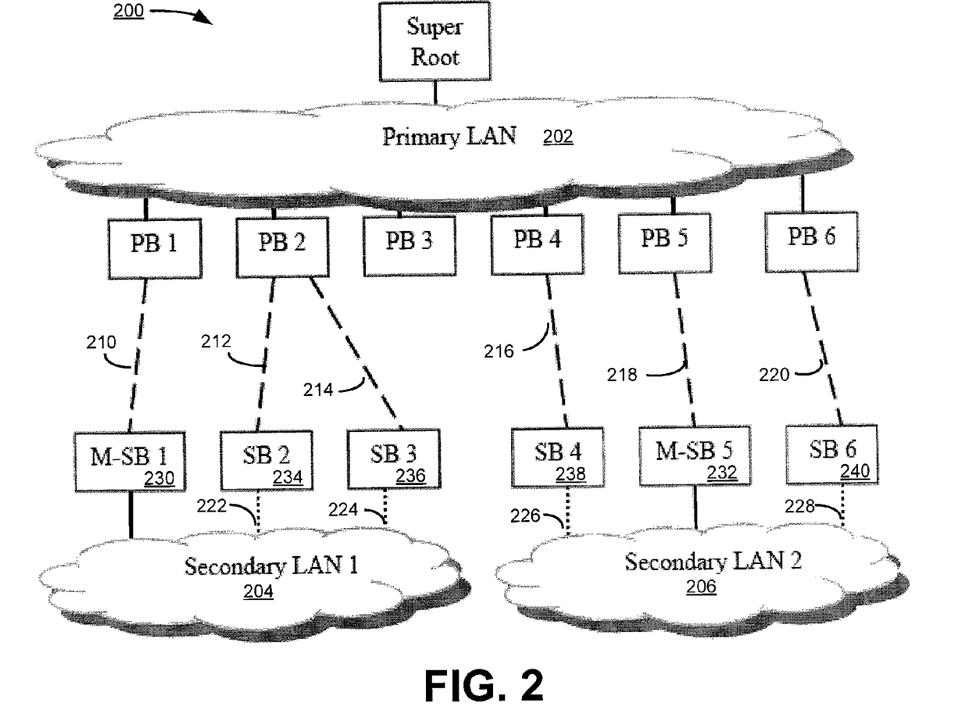
FIG. 2 is an example embodiment illustrating a LAN that comprises a root Ethernet LAN and two secondary Ethernet LANs.

FIG. 2 is an example embodiment illustrating a LAN 200 that comprises a root Ethernet LAN 202 and two secondary Ethernet LANs 204, 206. Ethernet spanning tree links to WBs are shown as solid lines. Relatively low-speed wireless spanning tree links 210, 212, 214, 216, 218, 220 are shown as dashed lines. The dotted lines, in FIG. 2, represent secondary Ethernet links 222, 224, 226, 228, to Slave SB ports that are in the "blocked" state.

Operation of the WRAP will now be described. In an example embodiment, the WRAP described herein extends the HSTP so that a secondary LAN can be bridged to a primary LAN over multiple wireless links.

A Link Endpoint Set (LES) is a set of wireless ports in WBs that are attached to the same transparently bridged wired LAN. A "secondary LES" is a set of wireless ports contained in SBs on the same secondary LAN. A "primary LES" is the set of wireless ports, contained in PBs on a primary LAN, that are bound to a single secondary LES. In an example embodiment, each secondary LAN has a single secondary LES; whereas, the primary LAN will have one primary LES for each secondary LES.

A single Master WB is established for each primary or secondary LES. Each WB in the LES, other than the Master WB, is a Slave WB. Each secondary LAN has a single Master SB for its single secondary LES. The Master SB and the set of Slave SBs, for a secondary LES, is just the Master SB and the set of Slave SBs, established by the HSTP (described above), for the corresponding secondary LAN.

Each secondary LES is bound to a single primary LES over the links that comprise a Route Bundle. The Bridge ID of the Master SB, for a secondary LES, is used as a Bundle ID to identify the Route Bundle, the Route Bundle's secondary LES, and the Route Bundle's primary LES.

As described herein supra, a Slave SB transitions its secondary Ethernet port to a "blocked" state if it is attached to the HSTP spanning tree on a wireless HSTP spanning tree link; otherwise, if the Slave SB is attached to the HSTP spanning tree on its Ethernet port, then the Slave SB transitions any wireless link to a parent WB to a blocked state. In FIG. 2, for example, Ethernet links to the secondary LANs, 204 and 206, which are in a blocked stated, are depicted as dotted lines. A Slave SB does not transparently bridge data frames on its "blocked" ports; however, a Slave SB does send and receive WRAP control frames and "routed" data frames on its blocked ports.

As used herein, a logical SB has a single secondary Link Endpoint. A single secondary bridging device, which contains multiple secondary Link Endpoints in multiple radios, can be considered as a set of multiple SBs—one logical SB for each secondary Link Endpoint.

Per the HSTP, a Master SB, on a secondary LAN, is, directly or indirectly, attached to a parent PB over a wireless spanning tree link. A Master SB sends a registration message to its parent PB to indicate that it is the Master SB for a secondary LAN. The registration message contains the Bundle ID selected by the SB. When the parent PB receives the registration message, the parent PB is established as the Master PB for the primary LES for the Route Bundle to the secondary LAN.

A Slave SB, on the secondary LAN, discovers the Master SB, the WLAN ID, and the secondary LES when it receives a HSTP Hello message from the Master SB on its Ethernet port. When a Slave SB discovers the Master SB for its secondary LAN, the Slave SB immediately sends a Join Request to the Master SB to join the secondary LES. The Join Request contains a list of one or more Link Endpoint addresses—one for each of the Slave SB's radio ports.

In FIG. 2, for example, M-SB-1 230 sends Hello messages that are transparently bridged over secondary LAN 204 to SB-2 234 and SB-3 236. SB-2 234 and SB-3 236 send a Join Request to M-SB-1 230 to join the secondary LES for secondary LAN 204. M-SB-5 232 sends Hello messages that are transparently bridged over secondary LAN 206 to SB-4 238 and SB-6 240. SB-4 238 and SB-6 240 send a Join Request to M-SB-5 232 to join the secondary LES for secondary LAN 206.

Each "attached" PB, on a primary LAN, sends periodic multicast HSTP Hello messages on each of its secondary radio ports. The Hello messages contain non-zero hop count and path cost values, a WLAN ID, a "load" value, and the Link Endpoint address of the respective radio port. A SB scans for Hello messages, which contain a matching WLAN ID, on each of its radio ports. A SB builds a "Neighbor PB List", for each radio port, as it receives Hello messages on the radio port. A Slave SB periodically sends its Neighbor PB List, for each radio port, to its Master SB. The Master SB for the secondary LAN compiles a database that contains the Neighbor PB List for each Link Endpoint in the LES. Each entry in the Neighbor PB List contains the path cost and load values, advertised by the respective PB.

After some initial "learning period" has expired, the Master SB initially executes a "route aggregation algorithm" that determines a "highest aggregate bandwidth" Route Bundle that bridges the secondary LAN to the primary LAN. In general, the algorithm maximizes the aggregate bandwidth by 1) minimizing the number of "intersecting" routes in the Route Bundle, and 2) minimizing the total "path cost" of the member routes. Two routes "intersect" if both routes share the same wireless link. In a simple implementation, the algorithm can avoid intersecting routes by assigning, at most, one secondary Link Endpoint to each primary Link Endpoint.

The Master SB sends a Link Assignment message to a Slave SB to direct the Slave SB to connect one of its secondary Link Endpoints to a primary Link Endpoint in a PB on the primary LAN. The Slave SB sends a Link Request message to establish a "member link" with a primary Link Endpoint. The Link Request message contains the Bundle ID that identifies the respective Route Bundle. After the link from the SB to the PB is established, the primary Link Endpoint in the PB is added to the primary LES for the Route Bundle. A Slave PB sends a Join Request, to the Master PB for the respective Route Bundle, to join its primary Link Endpoint to the primary LES.

Member links can be dynamically added to and deleted from an active Route Bundle as the set of neighbor PBs for each SB changes. The Master SB sends a Link Disconnect message to a Slave SB to direct the Slave SB to delete the link to a parent PB.

The Master SB for a secondary LAN is responsible for distributing traffic across the member links in the respective Route Bundle. In general, the Master SB distributes traffic so that the traffic load on each primary Link Endpoint, in the corresponding primary LES, is balanced. The Master SB determines the load for a primary Link Endpoint via the "load" values contained in Hello messages sent by the PB that owns the primary Link Endpoint.

The Master SB creates a "cross route", between a "descendant station" and the primary LAN, to redirect the station's inbound and outbound traffic over a member link in the Route Bundle. A "descendant station" of the Master SB is any station in the spanning sub tree rooted at the Master SB. The Master SB can use existing mechanisms, such as standard source learning or explicit station registration, to determine the set of "descendant" stations in its spanning sub tree.

Figure 3:
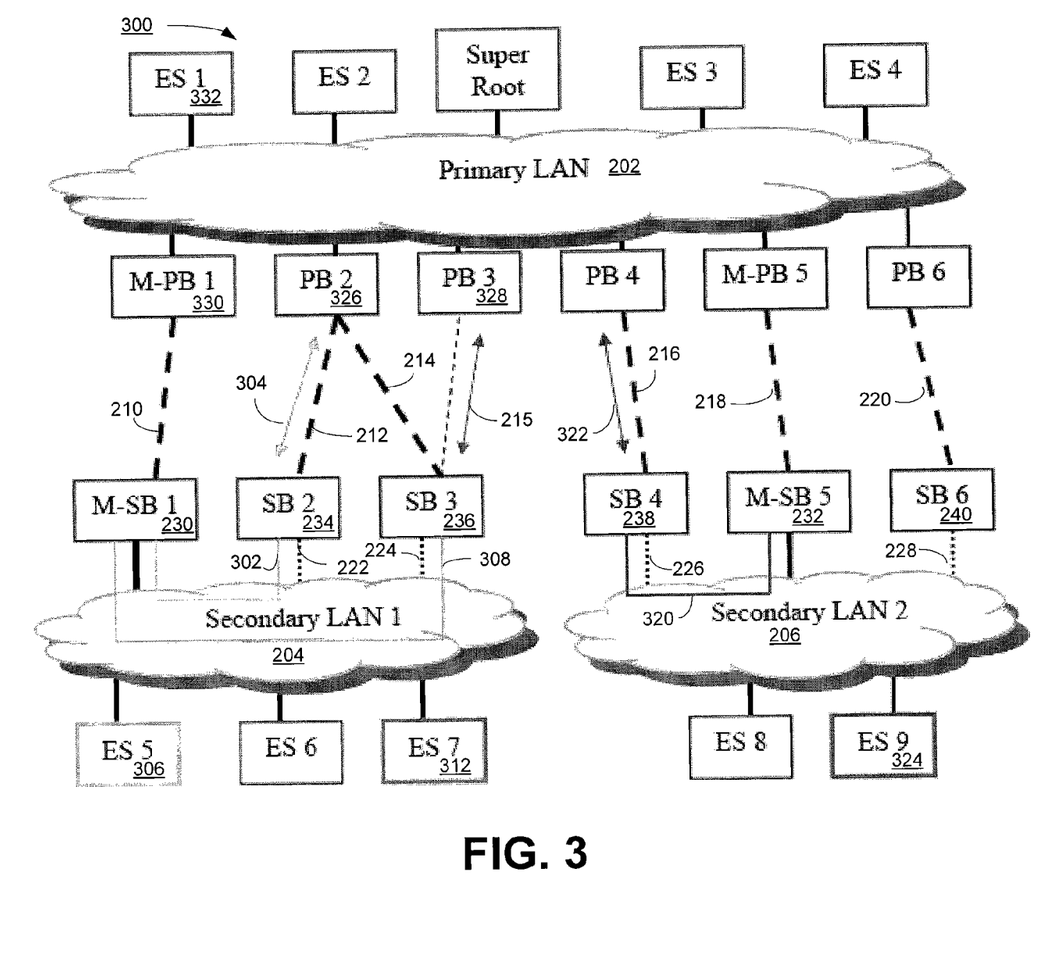
FIG. 3 is an example of the LAN illustrated in FIG. 2 with example cross routes.

FIG. 3 illustrates a WLAN 300 as illustrated in FIG. 2 with example cross routes. WLAN 300 comprises two route bundles. The member links for the first route bundle, between primary LAN 202 and secondary LAN 204, are links 210, 212, and 215. The member links for the second route bundle, between Primary LAN 202 and Secondary LAN 206 are links 216, 218, 220. The path illustrated by 302, 304 is the cross route for Ethernet Station (ES) 306. The path illustrated by 308, 310 is the cross route for ES 312. The path illustrated by 320, 322 is the cross route for ES 324.

Note in the example illustrated that the cross route from ES 306 to primary LAN 202 includes the spanning tree wireless link from PB 326 to SB 234; whereas, the cross route for ES 312 includes the non-spanning tree wireless link from PB 328 to SB 236. In practice, a Slave SB, such as SB 236, can move its wireless spanning tree link to a member link, so that it does not need to maintain 2 wireless links.

A Master SB, such as M-SB-1 230 or M-SB-5 232, generates a Route Setup Request to establish a "cross route" for a descendant station (e.g. ES 306 or ES 312 for MS 230, or ES 324 for MS 232) over a member link. The Master SB sends the Setup Request to the Slave SB for the member link; the Slave SB forwards the Setup Request to the parent PB for the member link; and the parent PB forwards the Setup Request to the Master PB for the respective primary LES. When the Master PB, on the primary LAN, receives the Setup Request, the Master PB adds the station to its "Cross-Routed Station List". The Master PB then generates a Route Setup Reply message, which is sent on the reverse path to the Slave PB, the Slave SB and, finally, to the Master SB. The cross route is fully established when the Master SB, which originated the Route Setup Request, receives the Route Setup Reply.

For example, to setup the cross route illustrated for ES 306, Master SB 230 generates a Route Setup Request to establish a "cross route" for descendant station ES 306 over a member link. Master SB 230 sends the Setup Request to the Slave SB 234 for the member link; the Slave SB 234 forwards the Setup Request to parent PB 326 for the member link; and parent PB 326 forwards the Setup Request to Master PB 330 for the respective primary LES. When Master PB 330, on primary LAN 302, receives the Setup Request, Master PB 330 adds the station to its "Cross-Routed Station List". Master PB 330 generates a Route Setup Reply message, which is sent on the reverse path to the Slave PB 326, Slave SB 234 and, finally, to Master SB 230. The cross route is fully established when Master SB 230, which originated the Route Setup Request, receives the Route Setup Reply.

A Master SB originates a Route Delete transaction to delete a cross route. A Master SB deletes a cross route for a descendant station if it learns that the station is no longer in its sub tree. A Master SB may also delete a station's cross route and re-assign the station to a different cross route to re-distribute traffic across the member routes in a Route Bundle.

When a Slave WB (i.e. a Slave SB or Slave PB) loses a member link to a peer WB, the Slave WB sends a link failure indication to its Master WB. When the Master WB receives the link failure indication, it removes any cross routes, which span the lost link, from its cross route table. A Master SB may redistribute the lost cross routes to any remaining member links.

Frames are forwarded "inbound", from a secondary LAN to the primary LAN, over a cross route as follows:
1) On a secondary LAN, frames that are destined to the primary LAN are transparently bridged, over the secondary LAN, to the Master SB for the secondary LAN. Standard source learning is used to direct the frames over the secondary LAN to the Master SB;
2) When the Master SB, for a secondary LAN, receives a frame on its secondary Ethernet port, it examines the source Ethernet address. If a cross route has been established for the station identified by the source address, then the Master SB forwards the frame on the cross route established for the station; and
3) When a PB on the primary LAN receives an inbound frame on a cross route, the PB bridges the frame onto the primary LAN.

Frames are forwarded "outbound", from the primary LAN to a secondary LAN, over a cross route as follows:
1) On the primary LAN, frames that are destined to a cross-routed station on a secondary LAN are transparently bridged to the Slave PB that contains the primary Link Endpoint for the station's cross route. Standard source learning is used to direct the frames over the primary LAN to the Slave PB.
2) When a Slave PB receives a frame on its primary Ethernet port, the Slave PB examines the destination address. If the Slave PB has a cross route for the destination station, then the Slave PB forwards the frame outbound to the Slave SB on the secondary LAN.
3) When a Slave SB receives an outbound cross-routed frame from its parent PB, the Slave SB forwards the frame to its Master SB on the cross route for the destination station.
4) When the Master SB receives an outbound cross-routed frame from a Slave SB, the Master SB bridges the frame onto the secondary LAN.
5) A Master PB does NOT transparently bridge a frame outbound on its spanning tree link to a secondary LAN if the destination address is in its Cross-Routed Station List for the secondary LAN.

Each inbound or outbound frame send on an Ethernet or wireless cross route link contains four addresses: source and destination "hop" addresses and source and destination "end-to-end" addresses. For example, in FIG. 3, assume that ES-7 312, on secondary LAN 204, sends an inbound frame to ES-1 332 on primary LAN 202. The end-to-end destination and source addresses, in the inbound frame, are the address of ES 332 and ES 312, respectively. The frame is transparently bridged from ES 312 over secondary LAN 204 to M-SB 230 (the Master WB for Secondary LAN 204). M-SB 230 encapsulates the frame with an Ethernet cross-route header and sends the frame to SB 326. The cross-route header contains a cross-route Ethernet type field and destination and source hop addresses. The destination hop address is the Ethernet address of SB 236 and the source hop address is the Ethernet address of M-SB 230. When SB 236 receives the inbound frame it forwards the frame inbound over the wireless link to PB 328. If the wireless link is an 802.11 link, then the frame is sent with the 802.11 4-address format: Address 1 contains the hop destination address—the Link Endpoint address in PB 328; address 2 contains the hop source address—the Link Endpoint address in SB 236; Address 3 contains end-to-end destination address—the address of ES 332; and Address 4 contains the end-to-end source address—the address of ES 312.

As described above, source learning is used to establish the forwarding path, for a station, in WRAP-unaware transparent bridges/switches in a primary or secondary wired LAN. Frames are "cross-routed" on a secondary LAN to avoid a "path flapping problem", where bridges/switches on a wired LAN constantly "learn" a different path to a station. To avoid the path flapping problem, all frames, which are bridged to/from a primary LAN, effectively enter and exit a secondary LAN through a single port—the Master SB's secondary Ethernet port. Frames are "tunneled" on the cross route between a Master SB and a Slave SB, as described above, with the address of the sending SB as the source MAC address.

The "path flapping problem" is best illustrated by example. In FIG. 3, for example, assume that ES-1 332 is actively sending frames to both ES-5 306 and ES-7 312. The frames destined to ES 306 are sent outbound over the member link to SB 234; whereas, the frames destined to ES 312 are sent outbound over the member link to SB 236. Note that the source-learned path for ES 332, on the secondary LAN, would constantly "flap" if SB 234 and SB 236 bridged the frames directly onto secondary LAN 204 (e.g. instead of tunneling the frames to M-SB 230).

What will now be explained is how the WRAP described herein can be extended to support routes that include multiple wireless and wired hops. In FIGS. 1-3, the primary LAN is comprised only of wired bridges/switches. However, the primary LAN can be re-defined hierarchically so that it includes the Root LAN and 0 or more nested secondary LANs. The set of secondary LANs that is included in a primary LAN is relative to a single secondary LAN. Form the perspective of a more outbound secondary LAN, more inbound secondary LANs are part of the primary LAN.

Figure 4:
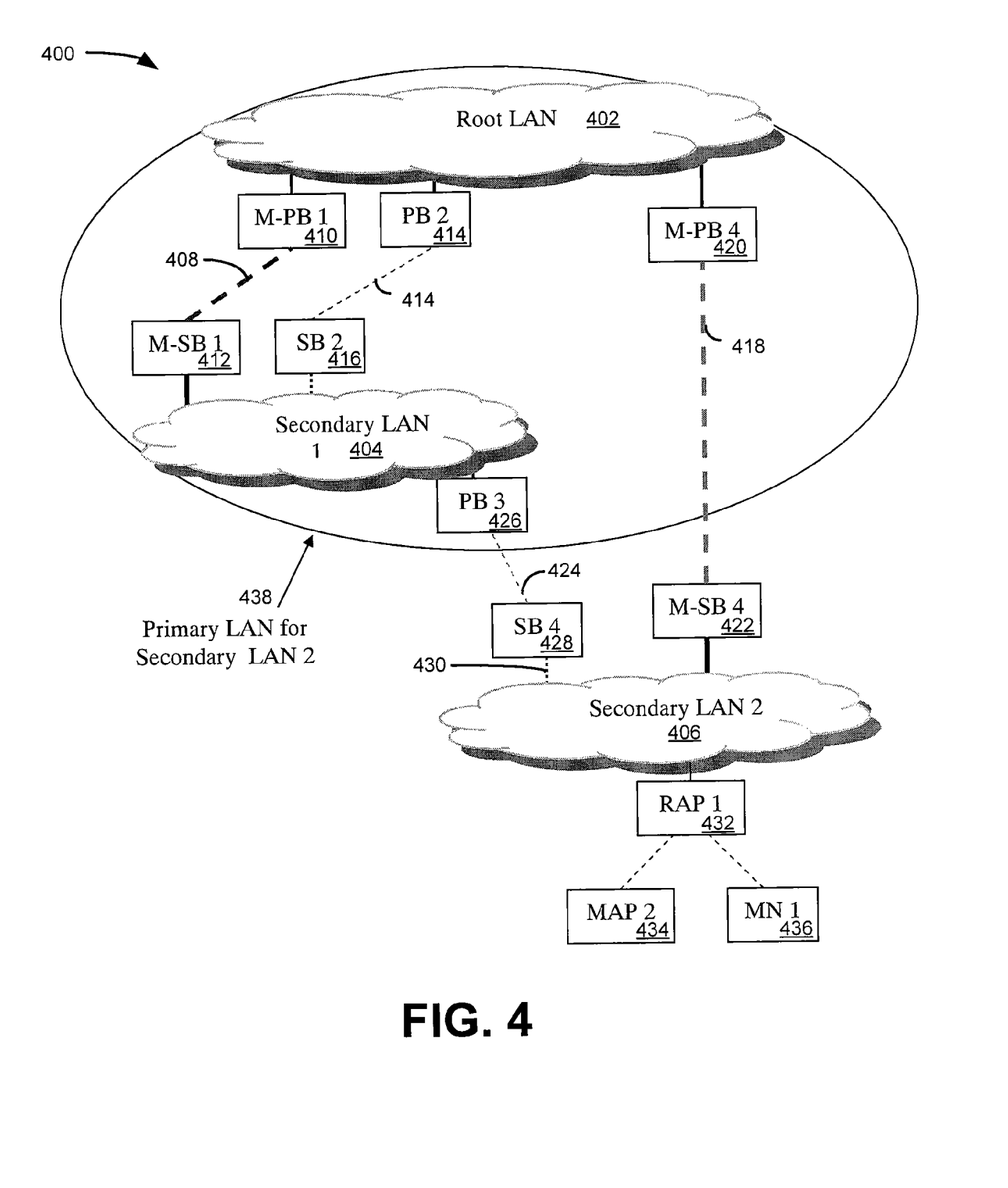
FIG. 4 illustrates an example LAN with a nested secondary LAN.

FIG. 4 illustrates an example LAN 400 with a nested secondary LAN. LAN 400 comprises a Root LAN 402 and secondary LAN 404 and secondary LAN 406. Link 408 comprising PB 410 and Master SB 412 and link 414 comprising PB 414 and SB 416 couple Root LAN 402 to secondary LAN 404. Link 418 comprising Master PB 420 and Master SB 422 couple Root LAN 402 to secondary LAN 406. Furthermore, link 424 comprising PB 426 and SB 428 couple secondary LAN 404 to secondary LAN 406. Link 430 couples SB 428 to secondary LAN 406. Secondary LAN further comprises a Repeater Access Point (RAP) 432 that is coupled to a Mesh Access Point (MAP) 434 and a mobile node (MN)) 436.

The primary LAN for secondary LAN 404 is Root LAN 402. However, the primary LAN 438 for secondary LAN 406 includes Root LAN 402 and secondary LAN 404. For this embodiment, a PB is defined as any WB that is attached to a wired LAN on its primary Ethernet port. In FIG. 4, note that PB 426 is attached to secondary LAN 404 on its primary Ethernet port. Also note that the PBs that contain the primary LES for secondary LAN 406, Master PB 420 and PB 426 are attached to different wired LANs, the root LAN 402 and secondary LAN 404 respectively.

A Repeater Bridge (RB) is wireless bridge that does not have a direct link to a Primary or secondary LAN. Instead, a RB is attached to the network on a wireless "primary port" to a parent WB (i.e. a parent PB or parent RB). A RB belongs to the same primary LAN as its ancestor PB. A RB appears as a PB to a SB on a secondary LAN. Route Setup and Delete messages are forwarded "hop-wise" to each intermediate RB on the wireless path between a SB and a PB on the primary LAN. For Example, when a RB receives a Route Setup Request from a Slave SB, the RB forwards the Setup Request inbound to its parent RB or PB.

As used herein, a wireless Access Point (AP) provides wireless access to a "Distribution LAN", but it does not bridge 2 wired LANs over a wireless link. Mobile Nodes (MNs) are attached to a parent AP over a wireless link.

The 802.1D STP, the HSTP, HSTP wireless spanning tree links, and the WRAP-based route aggregation protocol described herein are transparent to Access Points and MNs. A WRAP network, such as network 400, which includes a root LAN 402 and multiple secondary LANs 404, 406, functions as a single transparent Distribution LAN. Note that a single device may function both as a Wireless Bridge and as an Access Point.

From a logical WRAP perspective, an AP or MN is part of a secondary LAN if it is in the sub tree rooted at the secondary LAN. For example, RAP 432, MAP 434, and MN 436 are in the sub tree rooted at secondary LAN 406 and in the sub tree rooted at secondary LAN 404. Master SB 422 for secondary LAN 406, may establish a cross route, for MN 436, from secondary LAN 406 to the "primary LAN" 438. Likewise, Master SB 412 for secondary LAN 404, may independently establish a cross route, for MN 436, from secondary LAN 404 to the root LAN 402.

Figure 5:
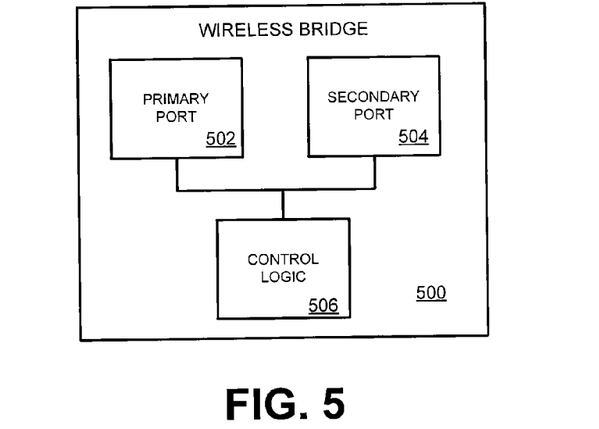
FIG. 5 illustrates a wireless bridge for implementing an example embodiment.

Referring to FIG. 5, there is illustrated a wireless bridge 500 configured in accordance with an example embodiment. Wireless bridge 500 is suitably adapted to operate and perform the functionality of a primary bridge (PB), Secondary Bridge (SB), Master Primary Bridge (MSB), Master Primary Bridge (MPB) and/or a Super Root described herein. Wireless bridge 500 comprises a primary port 502 and a secondary port 504. Control logic is coupled to primary port 502 and secondary port 504 and is operative to control the operation of wireless bridge 500. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Control logic 506 is operable for determining whether primary port 502 is coupled to a primary LAN. Control logic 506 is also operable for determining whether secondary port 504 is coupled to a secondary LAN.

Control logic 506 is responsive to determining that the secondary port is coupled to a secondary LAN to communicate with at least one other wireless bridge to select a master secondary bridge. The master secondary bridge is the designated bridge for the secondary LAN. In an example embodiment, the selected master secondary bridge selected is a secondary bridge attached to the primary LAN over a wireless spanning tree link and has an active Ethernet link to the secondary LAN. If two or more bridges have the lowest path cost, then the secondary bridge priority value is used as the tiebreaker. As described herein, a candidate SB sends periodic layer 2 multicast "Hello" messages on the secondary Ethernet LAN. The Hello messages contain a FALSE active flag, the WLAN ID (e.g. the Super Root ID), a Bridge ID, a SB priority value, a non-zero hop count value and a non-zero path cost value. There is one Master Secondary Bridge (MSB) elected for each secondary LAN; the remaining SBs are slave secondary bridges. The elected MSB sends Hello messages with a TRUE active flag.

Control logic 506 of the SB selected to be MSB then informs a PB that it is the MSB of the secondary LAN. The control logic 506 of the PB receiving the message then transitions the PB to MPB for the secondary LAN.

Secondary bridges scan for Hello messages from primary bridges that contain a matching WLAN ID on each of their radio ports. Control logic 506 for each SB builds a Neighbor PB list for each radio port it receives a Hello message from a PB. The control logic 506 of a slave SB periodically sends its neighbor list to the MSB. The control logic 506 of a MSB is operative to compile a database that contains the Neighbor PB list for each link endpoint. Each entry in the Neighbor PB list contains the path cost and load values advertised by the respective PB.

After an initial learning period, control logic 106 of the master SB executes a route aggregation algorithm (e.g. partially based on Dijkstra's Algorithm which is well known in the art) to determine a "highest aggregate "bandwidth" route bundle that bridges the secondary LAN to the primary LAN.

Control logic 506 of the MSB sends a Link Assignment message to a slave SB to direct the slave SB to connect a secondary Link Endpoint to a primary Link Endpoint of a PB on the primary LAN. Control logic 106 of a slave SB sends a Link Request message to establish a member link with a primary Link Endpoint. The Link Request contains a Bundle ID that identifies the respective route bundle. After the link from the SB to PB is established, the primary Link Endpoint in the PB is added to the primary LES for the Route Bundle. A Slave PB sends a Join Request, to the Master PB for the respective Route Bundle, to join its primary Link Endpoint to the primary LES.

Control logic 506 of the MSB is operable to distribute traffic across the member links in the Route Bundle. In general, the Master SB distributes traffic so that the traffic load on each primary Link Endpoint, in the corresponding primary LES, is balanced. The Master SB determines the load for a primary Link Endpoint via the "load" values contained in Hello messages sent by the PB that owns the primary Link Endpoint.

Control logic 506 of the master SB creates a "cross route", between a "descendant station" and the primary LAN, to redirect the station's inbound and outbound traffic over a member link in the Route Bundle. A "descendant station" of the Master SB is any station in the spanning sub tree rooted at the Master SB. The Master SB can use existing mechanisms, such as standard source learning or explicit station registration, to determine the set of "descendant" stations in its spanning sub tree.

For example, to setup the cross route illustrated for ES 306 in FIG. 3, control logic 506 in Master SB 230 generates a Route Setup Request to establish a "cross route" for descendant station ES 306 over a member link. Master SB 230 sends the Setup Request to the Slave SB 234 for the member link; control logic 506 in Slave SB 234 forwards the Setup Request to parent PB 326 for the member link; and control logic 506 in parent PB 326 forwards the Setup Request to Master PB 330 for the respective primary LES. When Master PB 330, on primary LAN 302, receives the Setup Request, control logic 506 in Master PB 330 adds the station to its "Cross-Routed Station List". Control logic 506 in Master PB 330 generates a Route Setup Reply message, which is sent on the reverse path to the Slave PB 326, Slave SB 234 and, finally, to Master SB 230. The cross route is fully established when Master SB 230, which originated the Route Setup Request, receives the Route Setup Reply.

The Master SB originates a Route Delete transaction to delete a cross route. A Master SB deletes a cross route for a descendant station if it learns that the station is no longer in its sub tree. A Master SB may also delete a station's cross route and re-assign the station to a different cross route to re-distribute traffic across the member routes in a Route Bundle.

When a Slave WB (i.e. a Slave SB or Slave PB) loses a member link to a peer WB, the Slave WB sends a link failure indication to its Master WB. When the Master WB receives the link failure indication, it removes any cross routes, which span the lost link, from its cross route table. A Master SB may redistribute the lost cross routes to any remaining member links.

Inbound and outbound frames on the secondary LAN are routed through the MSB. For example, control logic 506 of the MSB is operable to bridge frames using the HSTP spanning tree link and any previously established cross routes. Inbound frames to the primary LAN are received on secondary port 504. Control logic 506 routes the frame to the appropriate SB for the cross route. The appropriate SB for the cross route then bridges the frame to the primary LAN. If there is no cross route established for a descendant station, then control logic 506 bridges the frame to the primary LAN via primary port 502 over the HSTP spanning tree link to the primary LAN. Outbound frames sent on a cross link are received by a SB by its wireless primary port 502. The SB routes the frame via secondary port 504 to the MSB. The MSB then routes the frame onto the secondary LAN via its secondary port 504.

If control logic 506 determines that apparatus 500 is not the MSB and its (Ethernet) secondary port 504 is not its HSTP spanning tree root port, then control logic 106 blocks the secondary (Ethernet) port 504. Control logic 106 determines it is a slave SB if it receives Hello messages from the Master SB on its secondary port and apparatus 500 has a wireless link to a parent WB. A slave SB does not transparently bridge frames on a blocked secondary port 504. However, a slave SB will send and receive WRAP control frames and "routed" date frames (e.g. an encapsulated data frame with the address for apparatus 500) on a blocked secondary port 504. In an example embodiment, routed data frames are frames for which there is already an established cross route.

In an example embodiment, control logic 506 is operable to determine that apparatus 500 is a primary bridge responsive to determining that primary port 502 is coupled to a primary network to operate as a primary bridge. When operative as a primary bridge, control logic 506 is responsive to communicate with at least one other wireless bridge coupled to the primary network to select a super root. The primary bridge elected as super root is the PB with the highest root priority.

Control logic 506 for a PB establishes a cross route responsive to a setup request received on secondary port 504. The setup request is forwarded to the MPB for the primary LAN, control logic 506 in the MPB creates an entry in a cross route table maintained by control logic 506.

After a cross route is established on the primary LAN, when an outbound frame, destined to a station in the sub tree rooted at a secondary LAN, is received by the MPB on its Ethernet port to the primary LAN, control logic 506 of the MPB searches for the destination in its cross route table, if no entry is found the frame is bridged to the secondary LAN over the wireless HSTP spanning tree link to the MSB for the secondary LAN. If the control logic 506 of the MPB finds an entry in its cross route table, it does not bridge the frame (e.g. because the frame will be bridged by a Slave PB).

Similarly, after the cross route is established, the control logic 506 a Slave PB on the primary LAN will bridge outbound frames to the secondary LAN if the destination is found in its cross route table. Control logic 506 in a Slave PB will not transparently bridge an outbound frame not in its cross route table.

Figure 6:
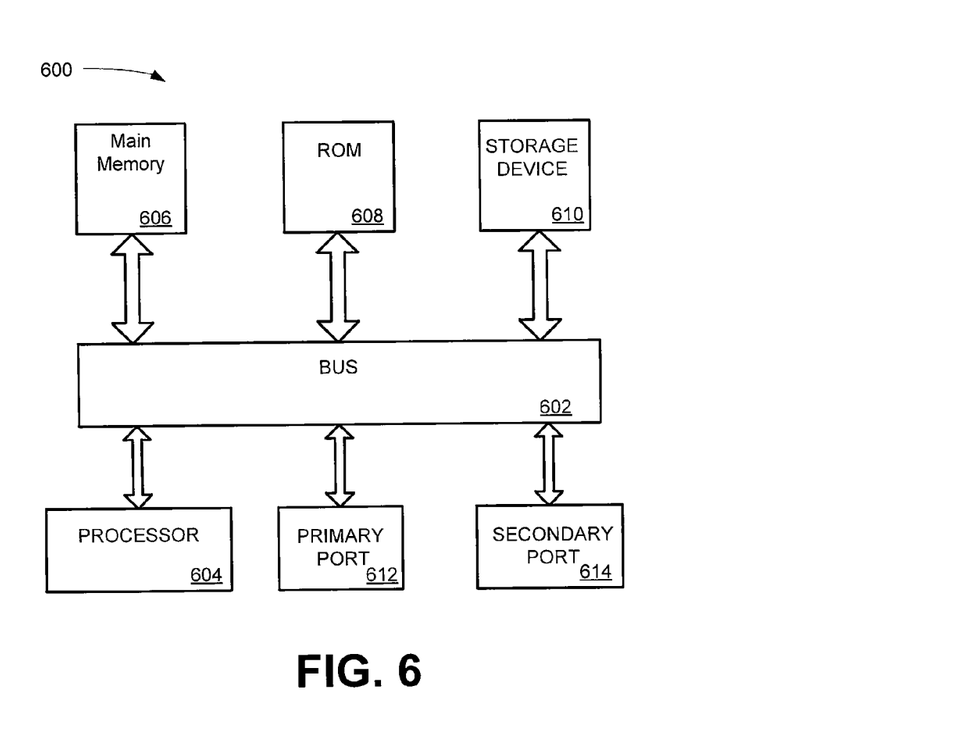
FIG. 6 illustrates an example of a computer system for implementing an example embodiment.

FIG. 6 is a block diagram that illustrates a computer system 600 upon which an embodiment of the invention may be implemented. Computer system 600 is suitable for performing the functionality of one or more of the primary bridges, secondary bridges, master primary bridges, master secondary bridges and super root nodes illustrated in FIGS. 1-4. Furthermore, computer system 600 is suitable to implement control logic 506 in FIG. 5. In addition, computer system 600 is suitable for implanting methodologies 700, 800, 900, 1000, 1100 (FIGS. 7-11 respectively) that will be described herein infra.

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

An aspect of the invention is related to the use of computer system 600 for Transparent Wireless Bridge Route Aggregation. According to one embodiment of the invention, Transparent Wireless Bridge Route Aggregation is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to non-volatile media, volatile media, and transmission media. Non-volatile media include for example optical or magnetic disks, such as storage device 610. Volatile media include dynamic memory such as main memory 606. Transmission media include coaxial cables, copper wire and fiber optics, including the wires that comprise bus 602. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a communication interfaces (ports) 612, 614. Ports 612, 614 provide for bidirectional communications with other devices. For example processor 604 can route data on bus 602 to or from a primary LAN via primary port 612, or to or from a secondary LAN via port 614. For example, if computer system 600 is implementing a primary bridge, primary port 612 is coupled to the primary Ethernet LAN, while secondary port 614 is coupled to a wireless bridge associated with a secondary LAN. If computer system 600 is implementing a secondary bridge, then secondary port 614 is coupled to a secondary Ethernet LAN and primary port 612 is coupled to a wireless bridge associated with the primary LAN. In any such implementation, ports 612, 614 send and receive electrical, electromagnetic, or optical signals that carry digital data streams representing various types of information.

In view of the foregoing structural and functional features described above, methodologies in accordance with various aspects of the present invention will be better appreciated with reference to FIGS. 7-11. While, for purposes of simplicity of explanation, the methodologies of FIGS. 7-11 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

Figure 7:
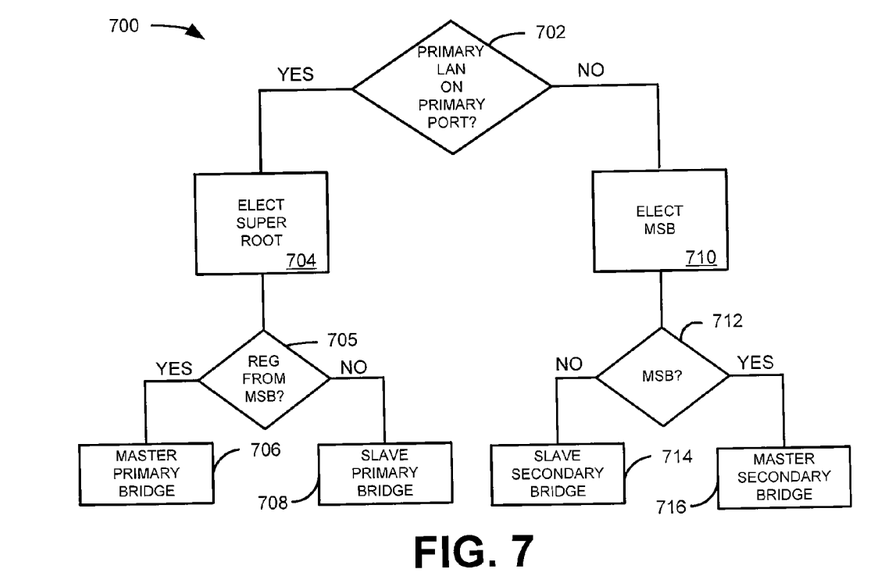
FIG. 7 illustrates a method for determining the operational mode of a wireless bridge.

FIG. 7 illustrates a method 700 for determining the operational mode of a wireless bridge. At 702, the WB determines whether a primary LAN is attached to its primary (Ethernet) port. If there is a primary LAN attached to the primary port (YES), the bridge is operating as a primary bridge and at 704 a super root is elected. As described herein, a super root is selected from the set of primary bridges coupled to the primary LAN. In an example embodiment, the super root is the primary bridge with the highest root priority. At 705 the wireless bridge determines whether a registration message has been received from a master secondary bridge (MSB). If a registration message has been received from a master secondary bridge (YES), then the wireless bridge transitions to a master primary bridge 706 operating state and performs the functionality of a MPB as described herein. If a registration message is not received from a MSB (NO), then at 708 the wireless bridge operates in a slave primary bridge mode and performs the functionality of a PB or SPB as described herein. For example, the MPB registers cross route links for PBs coupled to the secondary LAN. When a cross route registration message is received by a PB, it updates its cross route table and forwards the request to the MPB. The MPB updates its cross route table and generates a registration reply message that is routed to the MSB of the secondary LAN. When an outbound frame for the secondary LAN is received by the MPB, the MPB determines whether it has an entry for the frame in its cross route table, if it does not, then the MPB transparently bridges the frame to the MSB. When a slave PB receives an outbound frame, the slave PB bridges the frame if it has an entry in its cross route table.

If there is not a primary LAN attached to the primary port (NO), a master secondary bridge (MSB) is elected 710. At 712 it is determined whether a registration message has been received from a master secondary bridge (MSB). If a registration message has been received from a master secondary bridge (YES), then the wireless bridge transitions to a master secondary bridge 716 operating state. If a registration message has not been received from a master secondary bridge (NO), then the wireless bridge transitions to a slave secondary bridge 714 operating state.

Figure 8:
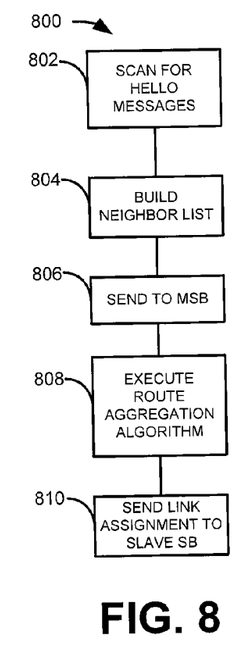
FIG. 8 illustrates a method for performing link assignment.

FIG. 8 illustrates a method 800 for performing link assignment. At 802, a SB scans for Hello messages. Each "attached" PB, on a primary LAN, sends periodic multicast HSTP Hello messages on each of its secondary radio ports. The Hello messages contain non-zero hop count and path cost values, a WLAN ID, a "load" value, and the Link Endpoint address of the respective radio port. A SB scans for Hello messages, which contain a matching WLAN ID, on each of its radio ports. At 804, each SB builds a "Neighbor PB List", for each radio port, as it receives Hello messages on the radio port. A Slave SB periodically sends its Neighbor PB List, for each radio port, to its Master SB at 806. The Master SB for the secondary LAN compiles a database that contains the Neighbor PB List for each Link Endpoint in the LES. Each entry in the Neighbor PB List contains the path cost and load values, advertised by the respective PB.

At 808, after some initial "learning period" has expired, the Master SB initially executes a "route aggregation algorithm" that determines a "highest aggregate bandwidth" Route Bundle that bridges the secondary LAN to the primary LAN. At 810, the Master SB sends a Link Assignment message to a Slave SB to direct the Slave SB to connect one of its secondary Link Endpoints to a primary Link Endpoint in a PB on the primary LAN. The Slave SB is responsive to send a Link Request message to establish a "member link" with a primary Link Endpoint. The Link Request message contains the Bundle ID that identifies the respective Route Bundle. After the link from the SB to the PB is established, the primary Link Endpoint in the PB is added to the primary LES for the Route Bundle.

Member links can be dynamically added to and deleted from an active Route Bundle as the set of neighbor PBs for each SB changes. The Master SB sends a Link Disconnect message to a Slave SB to direct the Slave SB to delete the link to a parent PB. This enables the network to be self configuring, as well as self-healing.

Figure 9:
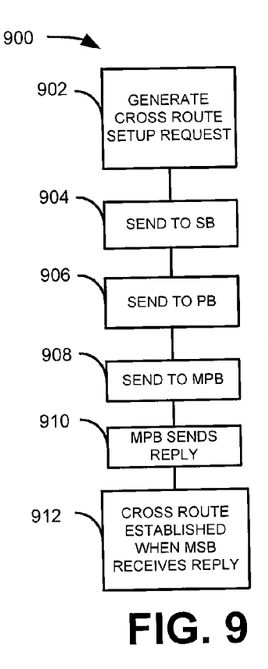
FIG. 9 illustrates a method for performing cross route setup.

FIG. 9 illustrates a method 900 for performing cross route setup. At 902 a Master SB generates a Route Setup Request to establish a "cross route" for a descendant station over a member link. At 904, the Master SB sends the Setup Request to the Slave SB for the member link; at 906 the Slave SB forwards the Setup Request to the parent PB for the member link; and at 908 the parent PB forwards the Setup Request to the Master PB for the respective primary LES. The Master PB, on the primary LAN, responsive to receiving the Setup Request adds the station to its "Cross-Routed Station List". At 910, the Master PB generates a Route Setup Reply message, which is sent on the reverse path to the Slave PB, the Slave SB and, finally, to the Master SB. The cross route is fully established when the Master SB, which originated the Route Setup Request, receives the Route Setup Reply at 912.

Figure 10:
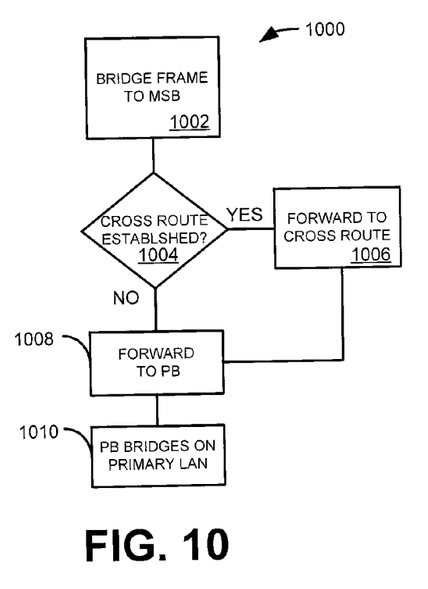
FIG. 10 illustrates a method for inbound cross-route forwarding.

FIG. 10 illustrates a method 1000 for inbound frame forwarding from a secondary LAN to the primary LAN, over a cross route. At 1002, frames that are destined to the primary LAN on the secondary LAN are transparently bridged, over the secondary LAN, to the Master SB for the secondary LAN. Standard source learning is used to direct the frames over the secondary LAN to the Master SB. At 1004, the Master SB, for a secondary LAN, responsive to receiving a frame on its secondary Ethernet port examines the source Ethernet address. If a cross route has been established for the station identified by the source address (YES), at 1006, the Master SB forwards the frame on the cross route established for the station. If a cross route has not been established (NO) the MSB transparently bridges the frame to the MPB. At 1008 the frame is forwarded to a PB (either the MPB by MSB or via an established cross route from the SB to the PB). At 1010, when a PB on the primary LAN receives an inbound frame on a cross route, the PB bridges the frame onto the primary LAN. When the MPB on the primary LAN receives an inbound frame from the MSB, the MPB bridges the frame onto the primary LAN.

Figure 11:
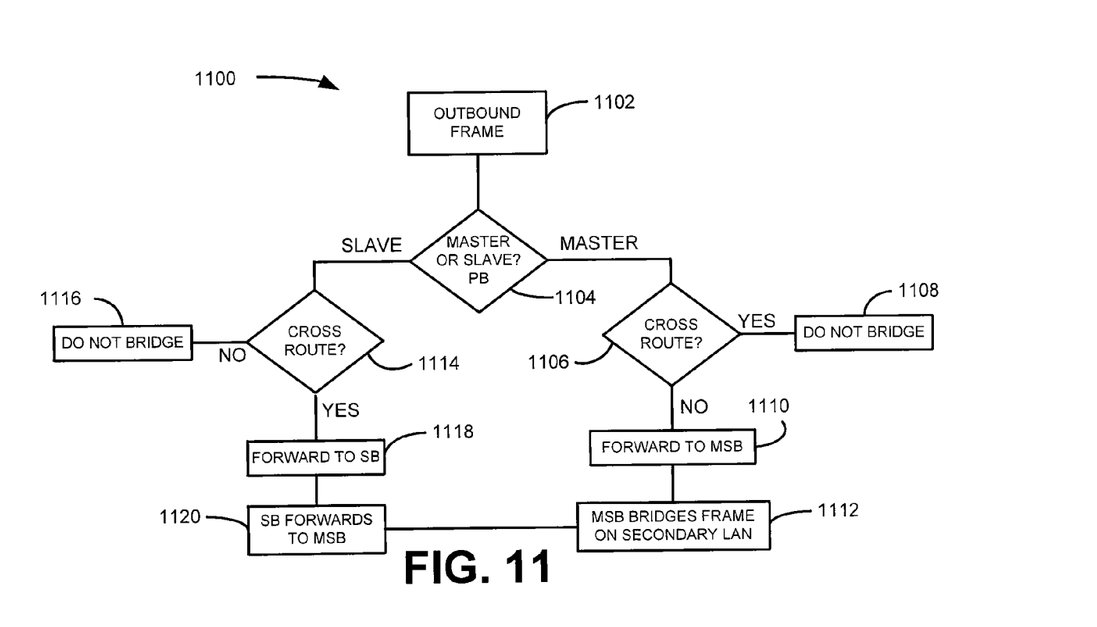
FIG. 11 illustrates a method for outbound cross-route forwarding.

FIG. 11 illustrates a method 1100 for forwarding "outbound" frames from the primary LAN to a secondary LAN. On the primary LAN, frames that are destined to a cross-routed station on a secondary LAN are transparently bridged to the Slave PB that contains the primary Link Endpoint for the station's cross route. Standard source learning is used to direct the frames over the primary LAN to the Slave PB.

At 1102 a frame is sent on the primary LAN that is to be bridged onto the secondary LAN. At 1104, it is determined whether the device receiving the frame is a master PB or a Slave PB.

If the device is a master PB (MASTER), the master PB examines the destination address. At 1106 the MPB ascertains whether it has a cross route established for the destination address. If a cross route has been established (YES) the frame is not forwarded as illustrated by 1108. If there is no cross route entry at 1106 (NO), then at 1110 the MPB transparently forwards the frame to the MSB. At 1112, the MSB responsive to receiving the frame bridges the frame on the secondary LAN.

If the device is a slave SB (SLAVE), at 1114 the slave SB determines whether it has a cross route for the destination. When a slave PB receives a frame on its primary Ethernet port, the slave SB examines the destination address. If the slave has a cross route for the destination station (YES) at 1118 the Slave PB forwards the frame outbound to an associated slave SB on the secondary LAN. At 1120, when a Slave SB receives an outbound cross-routed frame from its parent PB, the Slave SB forwards the frame to its Master SB at 1120 on the cross route for the destination station. At 1112, when the Master SB receives an outbound cross-routed frame from a Slave SB, the Master SB bridges the frame onto the secondary LAN.

If at 1114 the slave PB determines it does not have a cross route for the destination (NO) it does not bridge the frame (1116). A slave PB does not transparently bridge frames that are not in its cross route table.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a primary port;
a secondary port; and
control logic coupled to the primary port and the secondary port;
wherein the control logic is responsive to determining the secondary port is coupled to a secondary network to operate as a secondary bridge; and
wherein the control logic is responsive to operating as a secondary bridge to communicate with at least one other wireless bridge coupled to the secondary network to select a master secondary bridge that is a designated bridge for the secondary network.

2. An apparatus according to claim 1, wherein the master secondary bridge is a secondary bridge having a lowest path cost to a primary network.

3. An apparatus according to claim 1, wherein the control logic is responsive to being selected the master secondary bridge to acquire a neighbor list from the at least one other wireless bridge.

4. An apparatus according to claim 3, wherein the control logic is responsive to receiving the neighbor list to execute a route aggregation algorithm that determines the highest aggregate bandwidth to bridge the secondary network to a primary network.

5. An apparatus according to claim 3, wherein the control logic is operable to direct the at least one other wireless bridge to establish a member link by connecting a secondary link endpoint to a primary link endpoint associated with a primary bridge coupled to a primary network.

6. An apparatus according to claim 5, wherein the control logic is operable to direct the at least one other wireless bridge to automatically establish a second member link responsive to the neighbor list changing.

7. An apparatus according to claim 5, wherein the control logic is operable to direct the at least one other wireless bridge to automatically delete a member link responsive to the neighbor list changing.

8. An apparatus according to claim 1, further comprising the control logic is responsive to being selected the master secondary bridge to create a cross route between a descendant station and a primary network through the at least one other wireless bridge.

9. An apparatus according to claim 8, wherein an inbound frame from the descendant station is received through the secondary port and is routed through the secondary port to the at least one other wireless bridge for routing to the primary network.

10. An apparatus according to claim 8, wherein an outbound frame for the descendant station is received from at least one other wireless bridge and is routed on the secondary network.

11. An apparatus according to claim 8, wherein the control logic is responsive to a connection to the at least one other wireless bridge being lost to establish a new cross route for the descendant station through a second of the at least one other wireless bridge.

12. An apparatus according to claim 1, further comprising the control logic is responsive to being selected master secondary bridge to send a message via the primary port to a primary bridge associated with a primary network to inform the primary bridge that the primary bridge is the master primary bridge for the secondary network.

13. An apparatus according to claim 1, further comprising the control logic is responsive to determining master secondary bridge is one of the at least one other secondary bridges to switch the Ethernet port to a blocked state;
wherein while the Ethernet port is in the blocked state only control frames and data frames associated with a previously established cross route are routed through the Ethernet port.

14. An apparatus according to claim 1, further comprising the control logic is further responsive to determining that the primary port is coupled to a primary network to operate as a primary bridge.

15. An apparatus according to claim 14, further comprising the control logic is responsive to operating as a primary bridge to communicate with at least one other wireless bridge coupled to the primary network to select a super root based on highest root priority.

16. An apparatus according to claim 14, further comprising the control logic is responsive to operating as a primary bridge to establish a cross route for a descendant node coupled to a secondary bridge associated with the secondary port responsive to receiving a message from the secondary bridge to establish the cross route.

17. An apparatus according to claim 14, further comprising the control logic is responsive to operating as a primary bridge to only bridge outbound frames to the secondary network responsive to having a previously established cross route for a destination of the frame.

18. An apparatus according to claim 14, further comprising the control logic is responsive to operating as a primary bridge to operate as a master primary bridge responsive to receiving a message from a master secondary bridge associated with the secondary port, wherein the master primary bridge maintains a cross route table for cross routes established between at least one other wireless bridge associated with the primary network and the secondary network.

19. An apparatus according to claim 18, further comprising the control logic is operable to bridge frames from the primary network to the secondary network responsive to no cross route being established for a destination of the frame.

20. A method, comprising:
designating a single wireless route selected from a route bundle comprising a plurality of wireless routes coupling two Ethernet local area networks (LANs) as a spanning tree path between the two Ethernet LANs;
establishing cross routes between the two Ethernet LANs using unselected plurality of wireless routes coupling the two Ethernet LANs employing a route aggregation protocol;
grouping the cross routes into an aggregate route bundle; and
balancing traffic load to a primary network by distributing traffic to at least one route in the aggregate route bundle;
wherein a first of the two Ethernet LANs is established as a primary local area network (LAN) and a second of the two Ethernet LANs is established as a secondary LAN.

21. A method according to claim 20 further comprising:
selecting a single wireless bridge, which has a wireless route to the primary LAN and an Ethernet connection to the secondary LAN, as the Master Secondary Bridge for the secondary LAN;
designating at least one other wireless bridge which has a wireless route to the primary LAN and an Ethernet connection to the secondary LAN as a Slave Secondary Bridge on the secondary LAN
reporting wireless neighbor information to the Master Secondary Bridge by the Slave Secondary Bridge,
compiling the neighbor information from the Slave Secondary Bridge by the Master Secondary Bridge;
determining a best set of wireless links to interconnect the secondary LAN to the primary LAN;
establishing cross links to between the Slave Secondary Bridge and parent wireless bridges coupled to the primary LAN by the Master Secondary Bridge; and
assigning a descendant station in a sub tree rooted at the secondary LAN to a cross route by the Master Secondary Bridge.

22. A method according to claim 21, further comprising:
forwarding all inbound and outbound frames for a cross-routed station a single bi-directional cross route;
establishing the forwarding path to the cross route endpoint on the primary LAN for outbound frames sent to the station using standard source address learning, wherein standard source address learning establishes the forwarding path to the Master Secondary Bridge for inbound frames sent by the station;
forwarding an outbound frame for the cross routed station to the Master Secondary Bridge encapsulated with an outbound Ethernet tunnel header by the Slave Secondary Bridge; and
forwarding an inbound frame for the cross-routed station to a Slave Secondary Bridge encapsulated with an inbound Ethernet tunnel header by the Master Secondary Bridge;
wherein the inbound Ethernet tunnel header comprises an Ethernet Media Access Control (MAC) addresses of the Master Secondary Bridge, an Ethernet MAC address of the Slave Secondary Bridge and an Ethernet tunnel protocol identifier.

* * * * *

UNITED STATES PATENT AND TRADEMARK OFFICE
CERTIFICATE OF CORRECTION

PATENT NO. : 7,684,355 B2
APPLICATION NO. : 11/688021
DATED : March 23, 2010
INVENTOR(S) : Robert Meier and Shahriar Rahman

It is certified that error appears in the above-identified patent and that said Letters Patent is hereby corrected as shown below:

In claims 6, 7, 8, 9, 10, 11, 12, 13, 14, 15, 16, 17, 18, 19, 20, 21, and 22 Column 18, starting at line 46, please replace the claims as followed:

--6. An apparatus according to claim 1, further comprising the control logic is responsive to being selected the master secondary bridge to create a cross route between a descendant station and a primary network through the at least one other wireless bridge.
7. An apparatus according to claim 6, wherein an inbound frame from the descendant station is received through the secondary port and is routed through the secondary port to the at least one other wireless bridge for routing to the primary network.
8. An apparatus according to claim 6, wherein an outbound frame for the descendant station is received from at least one other wireless bridge and is routed on the secondary network.
9. An apparatus according to claim 6, wherein the control logic is responsive to a connection to the at least one other wireless bridge being lost to establish a new cross route for the descendant station through a second of the at least one other wireless bridge.
10. An apparatus according to claim 1, further comprising the control logic is responsive to being selected master secondary bridge to send a message via the primary port to a primary bridge associated with a primary network to inform the primary bridge that the primary bridge is the master primary bridge for the secondary network.
11. An apparatus according to claim 1, further comprising the control logic is responsive to determining master secondary bridge is one of the at least one other secondary bridges to switch the Ethernet port to a blocked state;
wherein while the Ethernet port is in the blocked state only control frames and data frames associated with a previously established cross route are routed through the Ethernet port.
12. An apparatus according to claim 1, further comprising the control logic is further responsive to determining that the primary port is coupled to a primary network to operate as a primary bridge.
13. An apparatus according to claim 12, further comprising the control logic is responsive to operating as a primary bridge to communicate with at least one other wireless bridge coupled to the primary network to select a super root based on highest root priority.
14. An apparatus according to claim 12, further comprising the control logic is responsive to operating as a primary bridge to establish a cross route for a descendant node coupled to a secondary bridge associated with the secondary port responsive to receiving a message from the secondary bridge to establish the cross route.

Signed and Sealed this

Fourth Day of May, 2010

David J. Kappos
*Director of the United States Patent and Trademark Office*

15. An apparatus according to claim 12, further comprising the control logic is responsive to operating as a primary bridge to only bridge outbound frames to the secondary network responsive to having a previously established cross route for a destination of the frame.

16. An apparatus according to claim 12, further comprising the control logic is responsive to operating as a primary bridge to operate as a master primary bridge responsive to receiving a message from a master secondary bridge associated with the secondary port, wherein the master primary bridge maintains a cross route table for cross routes established between at least one other wireless bridge associated with the primary network and the secondary network.

17. An apparatus according to claim 16, further comprising the control logic is operable to bridge frames from the primary network to the secondary network responsive to no cross route being established for a destination of the frame.

18. A method, comprising:
designating a single wireless route selected from a route bundle comprising a plurality of wireless routes coupling two Ethernet local area networks (LANs) as a spanning tree path between the two Ethernet LANs;
establishing cross routes between the two Ethernet LANs using unselected plurality of wireless routes coupling the two Ethernet LANs employing a route aggregation protocol;
grouping the cross routes into an aggregate route bundle; and
balancing traffic load to a primary network by distributing traffic to at least one route in the aggregate route bundle;
wherein a first of the two Ethernet LANs is established as a primary local area network (LAN) and a second of the two Ethernet LANs is established as a secondary LAN.

19. A method according to claim 18 further comprising:
selecting a single wireless bridge, which has a wireless route to the primary LAN and an Ethernet connection to the secondary LAN, as the Master Secondary Bridge for the secondary LAN;
designating at least one other wireless bridge which has a wireless route to the primary LAN and an Ethernet connection to the secondary LAN as a Slave Secondary Bridge on the secondary LAN reporting wireless neighbor information to the Master Secondary Bridge by the Slave Secondary Bridge, compiling the neighbor information from the Slave Secondary Bridge by the Master Secondary Bridge;
determining a best set of wireless links to interconnect the secondary LAN to the primary LAN;
establishing cross links to between the Slave Secondary Bridge and parent wireless bridges coupled to the primary LAN by the Master Secondary Bridge; and
assigning a descendant station in a sub tree rooted at the secondary LAN to a cross route by the Master Secondary Bridge.

20. A method according to claim 19, further comprising:
forwarding all inbound and outbound frames for a cross-routed station a single bi-directional cross route;
establishing the forwarding path to the cross route endpoint on the primary LAN for outbound frames sent to the station using standard source address learning, wherein standard source address learning establishes the forwarding path to the Master Secondary Bridge for inbound frames sent by the station;
forwarding an outbound frame for the cross routed station to the Master Secondary Bridge encapsulated with an outbound Ethernet tunnel header by the Slave Secondary Bridge; and
forwarding an inbound frame for the cross-routed station to a Slave Secondary Bridge encapsulated with an inbound Ethernet tunnel header by the Master Secondary Bridge;
wherein the inbound Ethernet tunnel header comprises an Ethernet Media Access Control (MAC) addresses of the Master Secondary Bridge, an Ethernet MAC address of the Slave Secondary Bridge and an Ethernet tunnel protocol identifier.

21. An apparatus according to claim 5, wherein the control logic is operable to direct the at least one other wireless bridge to automatically establish a second member link responsive to the neighbor list changing.

22. An apparatus according to claim 5, wherein the control logic is operable to direct the at least one other wireless bridge to automatically delete a member link responsive to the neighbor list changing.--